United States Patent
Krajenke et al.

(10) Patent No.: US 9,500,011 B2
(45) Date of Patent: Nov. 22, 2016

(54) PINTLE LATCH SYSTEM

(71) Applicant: GM GLOBAL TECHNOLOGY OPERATIONS LLC, Detroit, MI (US)

(72) Inventors: Gary W. Krajenke, Warren, MI (US); Anil A. Masih, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 41 days.

(21) Appl. No.: 14/535,506

(22) Filed: Nov. 7, 2014

(65) Prior Publication Data

US 2016/0129950 A1    May 12, 2016

(51) Int. Cl.
| | |
|---|---|
| E05B 15/02 | (2006.01) |
| E05C 1/12 | (2006.01) |
| E05C 1/00 | (2006.01) |
| B60R 9/06 | (2006.01) |

(52) U.S. Cl.
CPC ............... *E05C 1/12* (2013.01); *B60R 9/065* (2013.01); *E05C 1/004* (2013.01)

(58) Field of Classification Search
CPC ..................................................... E05B 15/02
USPC ........... 292/340, 341.15, 341.17, 57, 58, 71, 292/63, DIG. 12
See application file for complete search history.

(56) References Cited

U.S. PATENT DOCUMENTS

| | | | | |
|---|---|---|---|---|
| 3,521,922 | A * | 7/1970 | Bowling | E05C 17/365 292/145 |
| 4,687,236 | A * | 8/1987 | Rasche | E05C 5/00 24/645 |
| 4,746,152 | A * | 5/1988 | Willcox | E05B 63/128 292/150 |
| 6,106,035 | A * | 8/2000 | Hetherington | E05C 5/04 292/251 |
| 6,364,380 | B2 * | 4/2002 | Franz | E05B 15/029 292/219 |
| 6,817,637 | B1 * | 11/2004 | Anderson | E05B 15/022 292/150 |
| 7,044,509 | B2 * | 5/2006 | Radel | E05B 63/128 292/106 |
| 7,438,335 | B1 * | 10/2008 | Uyeda | E05B 47/0046 292/341.15 |
| 2013/0180991 | A1 * | 7/2013 | Williams | E05B 85/045 220/324 |

FOREIGN PATENT DOCUMENTS

DE            3240452 A1 *   5/1984  ......... E05B 17/0012

* cited by examiner

*Primary Examiner* — H Gutman
(74) *Attorney, Agent, or Firm* — Quinn Law Group, PLLC

(57) ABSTRACT

A latch system includes a striker and a latch mechanism. The striker includes a pintle having a head portion. The latch mechanism includes a first latch door and a second latch door, each rotatable between a respective latch position and a respective insertion position. The first latch door and the second latch door each define a latch section and a release section disposed opposite each other. When the first latch door and the second latch door are disposed in their respective insertion positions, the latch sections are operable to receive the head portion therebetween. When the first latch door and the second latch door are disposed in their respective latch positions, the latch sections are operable to engage the head portion in latching engagement, and the release sections are operable to release the head portion of the pintle.

17 Claims, 6 Drawing Sheets

PINTLE LATCH SYSTEM

TECHNICAL FIELD

The disclosure generally relates to a tailgate assembly for a vehicle, and more specifically to a pintle latch system for latching a cover of a tailgate storage compartment to a structure of the tailgate assembly.

BACKGROUND

Vehicles may include a tailgate assembly to close an end of a cargo area. For example, in pick-up trucks, the tailgate assembly is used to close an open bed of the truck, whereas in Sport Utility Vehicles (SUV), the tailgate assembly may be used to close the enclosed rear cargo area of the SUV. The tailgate assembly may define a cargo storage compartment, and include a cover that closes the cargo storage compartment. The cover is typically disposed within an interior of the cargo area when the tailgate assembly is closed. The tailgate assembly may include a latch system to latch the cover to the support structure of the tailgate assembly. The latch system must fit within the tight packaging requirements of the tailgate assembly.

SUMMARY

A latch system is provided. The latch system includes a striker and a latch mechanism. The striker includes a pintle having a head portion. The pintle extends along a pintle axis. The latch mechanism is releasably engageable with the pintle. The latch mechanism includes a first latch door and a second latch door. Each of the first latch door and the second latch door are rotatable between a respective latch position and a respective insertion position. The first latch door and the second latch door each include a distal edge, which defines a latch section and a release section disposed opposite each other. The latch sections of the first latch door and the second latch door are operable to receive the head portion of the pintle therebetween, when the first latch door and the second latch door are disposed in their respective insertion positions. The latch sections of the first latch door and the second latch door are operable to engage the head portion of the pintle in latching engagement when the first latch door and the second latch door are disposed in their respective latch positions. The release sections of the first latch door and the second latch door are operable to release the head portion of the pintle from latching engagement with the first latch door and the second latch door.

A tailgate assembly for a vehicle is also provided. The tailgate assembly includes a structure having an interior surface that defines a compartment, a first lateral edge surface, and a second lateral edge surface. The first lateral edge surface and the second lateral edge surface are disposed on opposite lateral edges of the interior surface. A cover is moveably attached to the structure for covering the compartment. The cover includes a pintle extending along a pintle axis and including a head portion disposed at a distal end of the pintle. A latch mechanism is attached to the structure, and is releasably engageable with the pintle. A release mechanism is coupled to the latch mechanism, and is disposed on one of the first lateral edge surface or the second lateral edge surface of the structure. The latch mechanism includes a base plate attached to the structure, and a support plate slideably supported by the base plate. The support plate is coupled to the release mechanism for movement along a release axis, in a direction substantially perpendicular to the pintle axis, when actuated by the release mechanism. A first latch door is rotatably supported by the support plate, and is moveable with the support plate along the release axis. The first latch door is rotatable between a latch position and an insertion position. A second latch door is rotatably supported by the support plate, and is moveable with the support plate along the release axis. The second latch door is rotatable between a latch position and an insertion position. The first latch door and the second latch door each include a distal edge defining a latch section and a release section disposed opposite each other. When the first latch door and the second latch door are disposed in their respective insertion positions, the latch sections of the first latch door and the second latch door are operable to receive the head portion of the pintle therebetween. When the first latch door and the second latch door are disposed in their respective latch positions, the latch sections of the first latch door and the second latch door are operable to engage the head portion of the pintle in latching engagement. When the first latch door and the second latch door are disposed in their respective latch positions, the release sections of the first latch door and the second latch door are operable to release the head portion of the pintle from latching engagement with the first latch door and the second latch door.

Accordingly, the pintle latch system uses the rotating first and second latch doors to retain the head portion of the pintle, and allows the releasing of the pintle by moving the first and second latch doors along a release axis, which is perpendicular to the pintle axis. Movement of the pintle substantially along the pintle axis into contacting engagement with the latch sections of the first latch door and the second latch door moves the first latch door and the second latch door into their respective insertion positions to allow the head portion of the pintle to pass between the latch sections of the first latch door and the second latch door. The biasing device biases the first latch door and the second latch door into their respective latch positions, after the head portion of the pintle has passed between the latch sections of the first latch door and the second latch door, to latch the pintle to the latch mechanism. Movement of the first latch door and the second latch door along the release axis relative to the pintle, positions the head portion of the pintle between the release sections of the first latch door and the second pivoting latch to de-latch the pintle from the latch mechanism. The pintle latch system is compact, and suitable for use in the tailgate assembly to latch the cover to the structure of the tailgate assembly. The pintle latch system allows the release mechanism to be remotely located away from the latch mechanism, by allowing for linear actuation, i.e., sliding movement of the first and second latch doors along the release axis.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
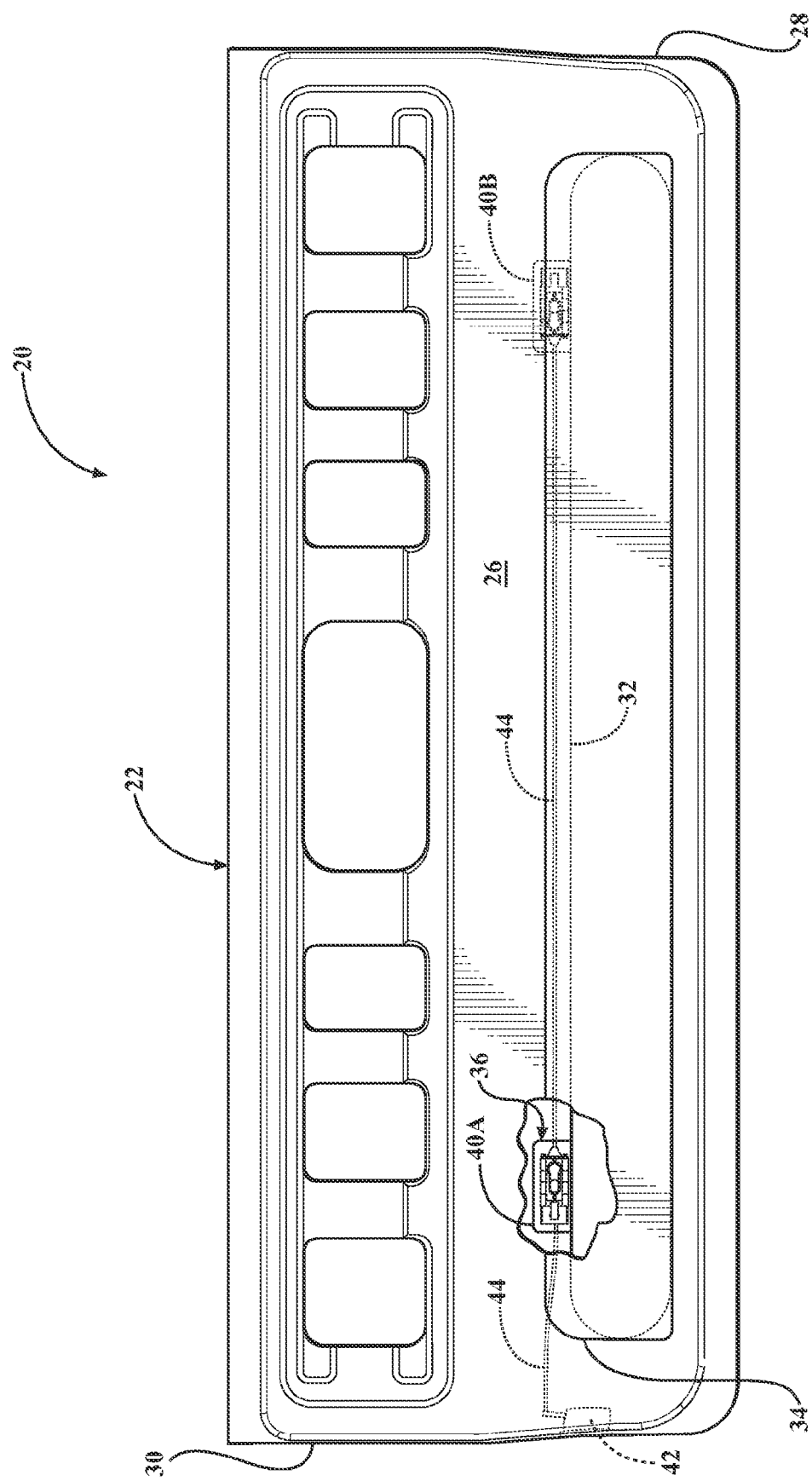
FIG. 1 is a schematic plan view of a tailgate assembly for a vehicle, with a cutaway section to show a latch system.
Figure 2:
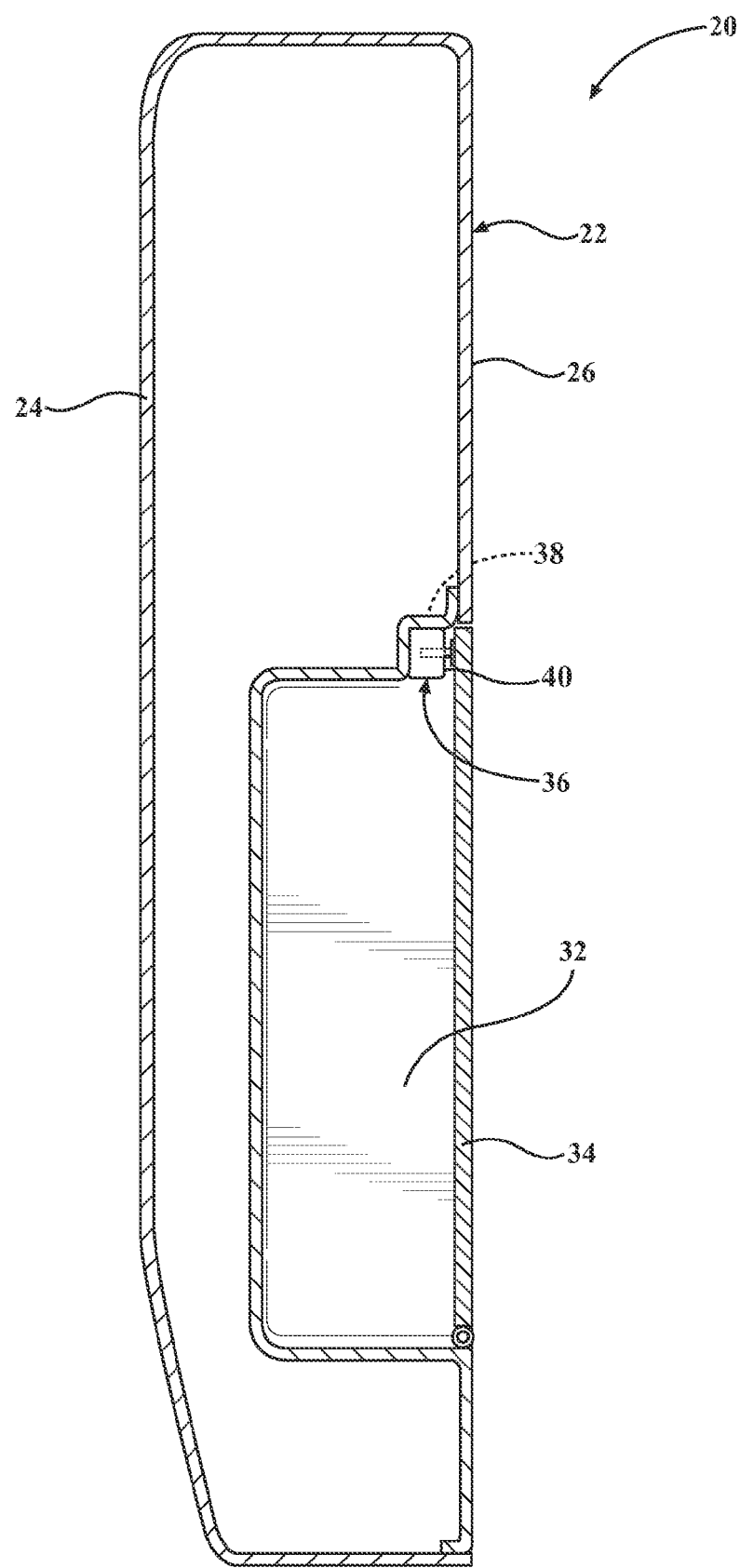
FIG. 2 is a schematic cross sectional view of the tailgate assembly.

Referring to the Figures, wherein like numerals indicate like parts throughout the several views, a tailgate assembly is generally shown at 20 in FIGS. 1 and 2. Referring to FIGS. 1 and 2, the tailgate assembly 20 is for a vehicle, such as but not limited to a bed of a pick-up truck. The tailgate assembly 20 is configured to close an open end of an exposed cargo area, such as may be defined by the bed of the pick-up truck.

The tailgate assembly 20 includes a structure 22. The structure 22 may include one or more components formed to define the shape of the tailgate assembly 20, and provide the required structural rigidity. The structure 22 may include one or more frame members, braces, exterior and/or interior panel members, trim pieces, etc., attached together to define the completed assembly. As shown in FIG. 2, the structure 22 includes an exterior surface 24, an interior surface 26. As shown in FIG. 1, the structure further includes a first lateral edge surface 28, and a second lateral edge surface 30. The exterior surface 24 defines the exterior of the tailgate assembly 20, and is disposed generally opposite from the interior surface 26. The first lateral edge surface 28 and the second lateral edge surface 30 are disposed opposite each other, at opposing lateral edges of the interior surface 26 and the exterior surface 24. As such, the first lateral edge surface 28 and the second lateral edge surface 30 extend between the exterior surface 24 and the interior surface 26.

Referring to FIG. 2, the interior surface 26 of the tailgate assembly 20 defines a storage compartment 32. The compartment 32 may be sized and/or shaped in any desirable manner, but is generally defined by a volume that is recessed into the interior surface 26 of the tailgate assembly 20. The tailgate assembly 20 includes a cover 34, which is moveably attached to the structure 22. The cover 34 is operable to close the compartment 32. The cover 34 is moveable between a closed position and an open position. When disposed in the closed position, the cover 34 seals or closes the compartment 32. When disposed in the open position, the cover 34 opens or allows access to the compartment 32.

Referring to FIGS. 1 and 2, the tailgate assembly 20 includes a latch system 36. The latch system 36 includes a striker 38 and a latch mechanism 40. The striker 38 is attached to the cover 34, and the latch mechanism 40 is attached to the structure 22. The latch mechanism 40 may be actuated, i.e., moved, between a latch position and a release position. When the latch mechanism 40 is moved into or otherwise disposed in the latch position, the latch mechanism 40 is operable to engage the striker 38 to latch the cover 34 to the structure 22 of the tailgate assembly 20, thereby closing the compartment 32. When the latch mechanism 40 is moved into the release position, the latch mechanism 40 is operable to release the striker 38 to allow rotational movement of the cover 34 relative to the structure 22, thereby providing access to the compartment 32.

Preferably, the latch mechanism 40 is disposed a distance inboard of either the first lateral edge surface 28 and/or the second lateral edge surface 30. As shown in FIG. 1, the tailgate assembly 20 includes a first latch mechanism 40A and a second latch mechanism 40B, equally spaced from the first lateral edge surface 28 and the second lateral edge surface 30 respectively. The first latch mechanism 40A and the second latch mechanism 40B are referred to generally within the written specification by the reference numeral 40 and are referred to specifically and shown within the drawings by the reference numerals 40A, and 40B respectively. It should be appreciated that the position of the latch mechanism 40 may differ from the exemplary embodiment shown in the Figures. For example, the tailgate assembly 20 may only include a single latch mechanism 40 disposed at an approximate longitudinal centerline of the vehicle, or a single latch mechanism 40 disposed adjacent one of the first lateral edge surface 28 and/or the second lateral edge surface 30.

As shown in FIG. 1, the tailgate assembly 20 further includes a release mechanism 42 that is coupled to the latch mechanism 40. The release mechanism 42 is operable to move the latch mechanism 40 between the latch position and the release position. The release mechanism 42 may be coupled to the latch mechanism 40 in any suitable manner that allows the release mechanism 42 to control and/or actuate the latch mechanism 40. For example, a cable 44 may interconnect the latch mechanism 40 and the release mechanism 42. Actuation of the release mechanism 42 transfers movement through the cable 44 to the latch mechanism 40, to move the latch mechanism 40 between the latch position and/or the release position. The release mechanism 42 may include any suitable mechanism capable of actuating the latch mechanism 40, and may include, for example, a levered pull handle operable to apply a linear force to the cable 44, which in turn moves the latch mechanism 40.

Figure 7:
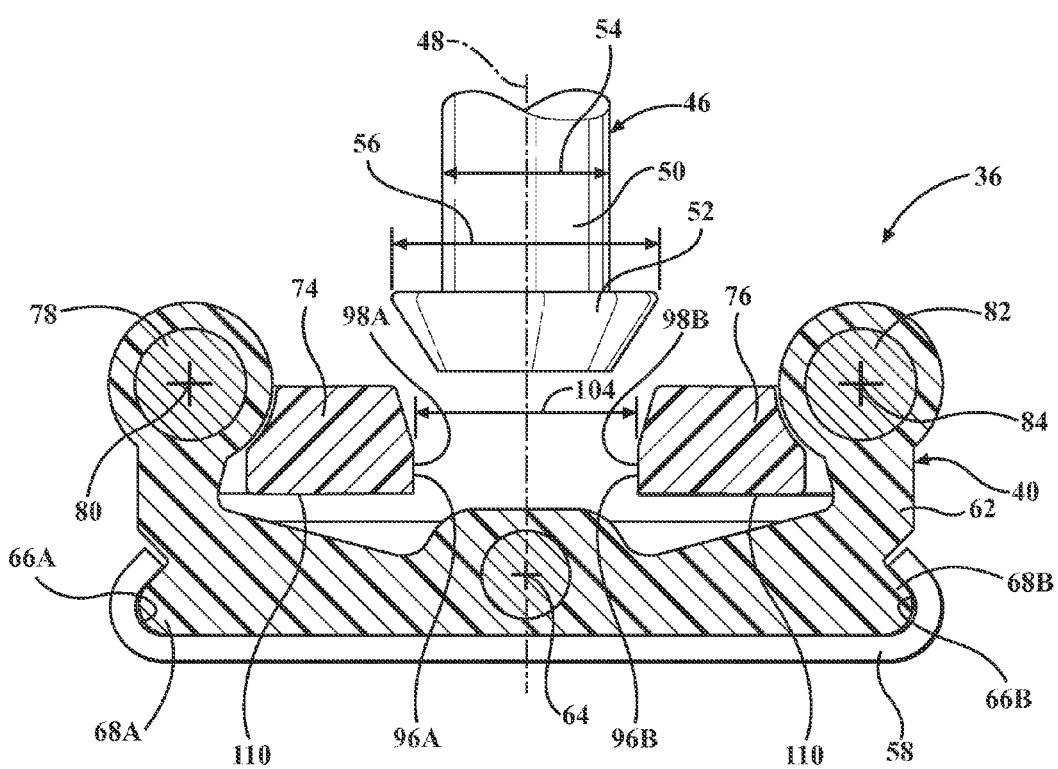
FIG. 7 is a schematic cross sectional view of the latch system showing the pintle disengaged from the latch mechanism.

As noted above, the latch system 36 includes the striker 38 and the latch mechanism 40. The striker 38 is attached to the cover 34, and the latch mechanism 40 is attached to the structure 22 of the tailgate assembly 20. Referring to FIGS. 3 and 4, and 7 through 9, the striker 38 includes a pintle 46. The pintle 46 extends along a pintle axis 48. As best shown in FIG. 7, the pintle 46 includes a shank portion 50 and a head portion 52, with the head portion 52 disposed at a distal end of the shank portion 50. The shank portion 50 defines a shank diameter 54, and the head portion 52 defines a head diameter 56. The head diameter 56 is larger than the shank diameter 54.

Figure 4:
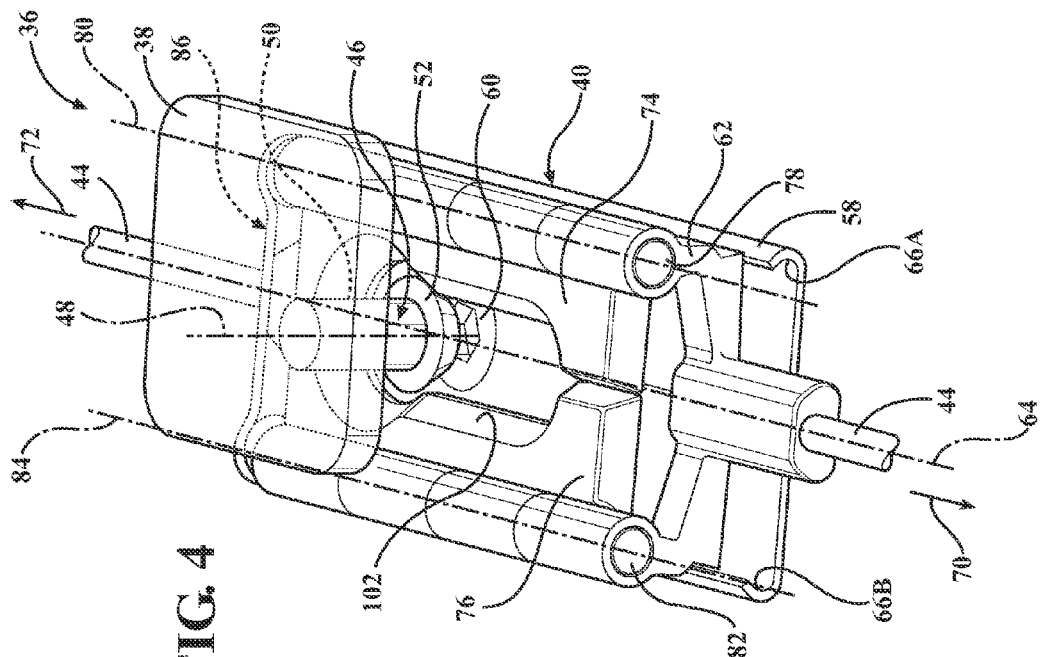
FIG. 4 is a schematic perspective view of the latch system showing the latch mechanism positioned for releasing the pintle.
Figure 3:
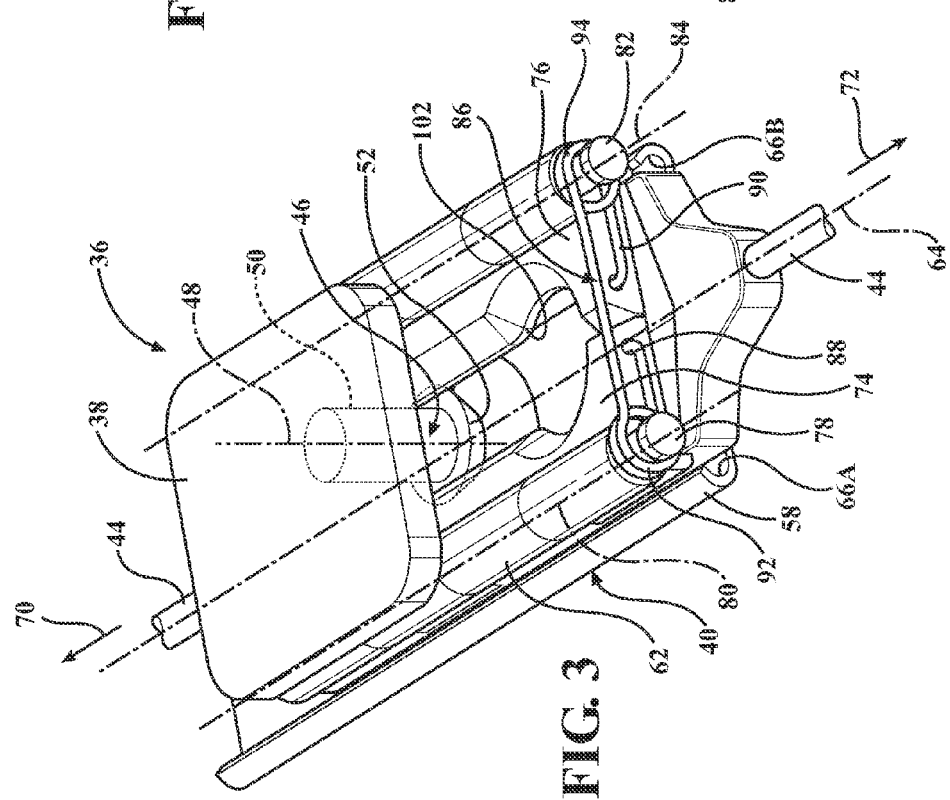
FIG. 3 is a schematic perspective view of the latch system of the tailgate assembly, showing a pintle latched to a latch mechanism.
Figure 5:
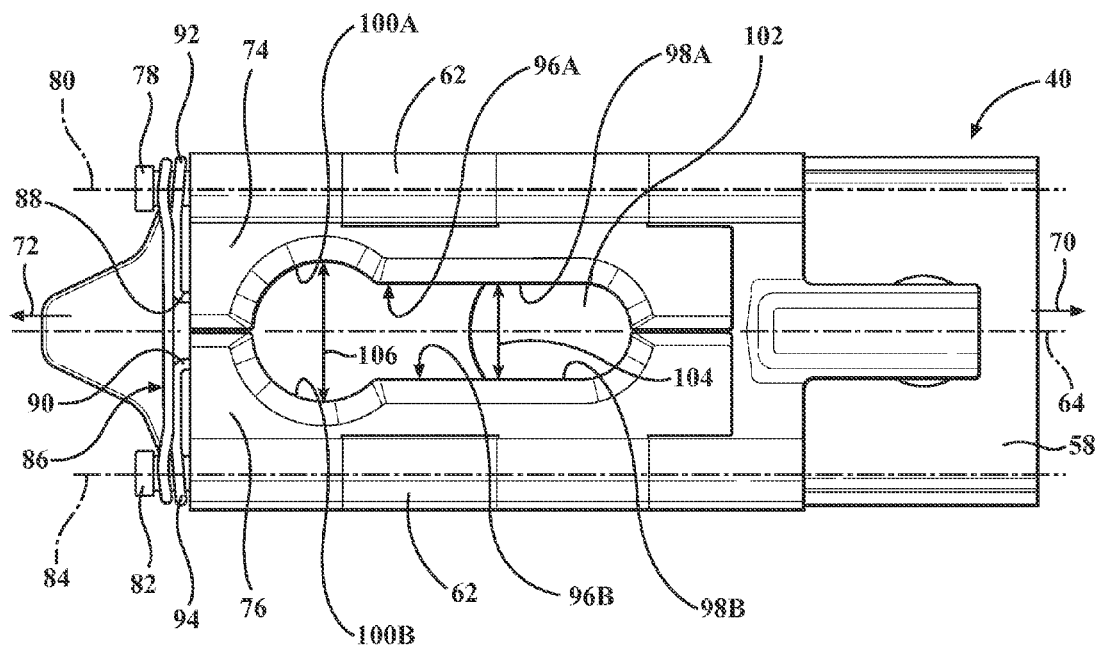
FIG. 5 is a schematic plan view of the latch mechanism.

Referring to FIGS. 3 and 4, the latch mechanism 40 is releasably engageable with the pintle 46, to latch the cover 34 to the structure 22 of the tailgate assembly 20. The pintle 46 is shown latched to the latch mechanism 40 in FIG. 3, and is shown de-latched from the latch mechanism in FIG. 4. Referring to FIG. 5, the latch mechanism 40 includes a base plate 58. The base plate 58 is configured for attachment to the structure 22 of the tailgate assembly 20. The base plate 58 may be attached to the structure 22 in any suitable manner. For example, the base plate 58 may be attached to the structure 22 by one or more fasteners 60. Alternatively, the base plate 58 may be welded, bonded, or otherwise affixed to the structure 22. Referring to FIGS. 3 and 4, a support plate 62 is slideably supported by the base plate 58 for linear movement along a release axis 64. Referring to FIG. 5, the release axis 64 is disposed substantially perpendicular to the pintle axis 48. Accordingly, the support plate 62 is moveable in a direction that is substantially perpendicular to the pintle axis 48.

Figure 8:
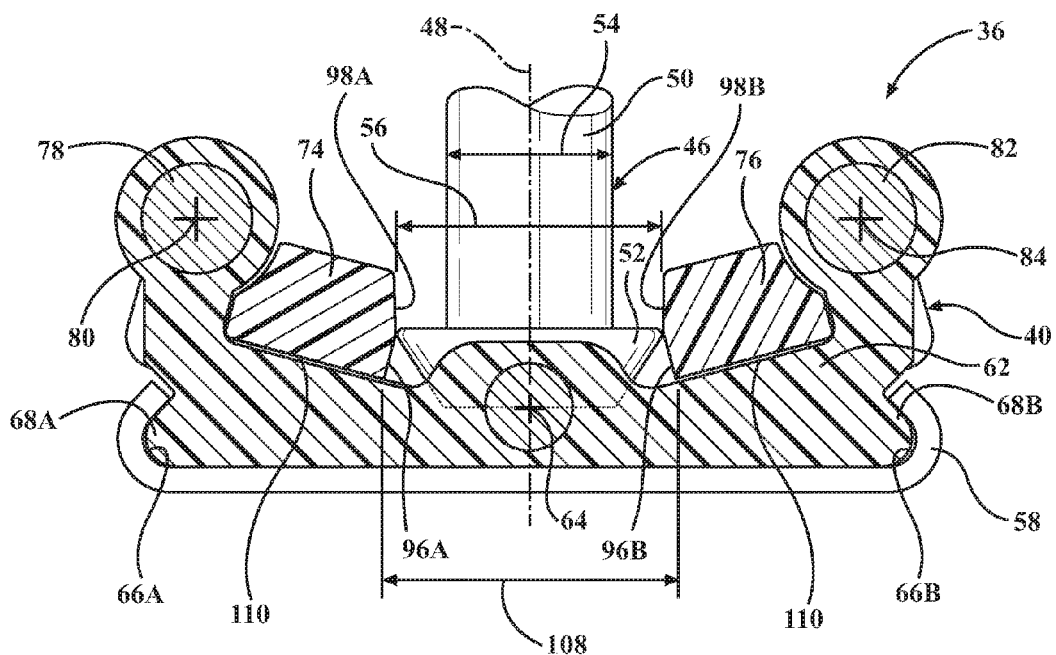
FIG. 8 is a schematic cross sectional view of the latch system showing the pintle and the latch mechanism in an insertion position.
Figure 9:
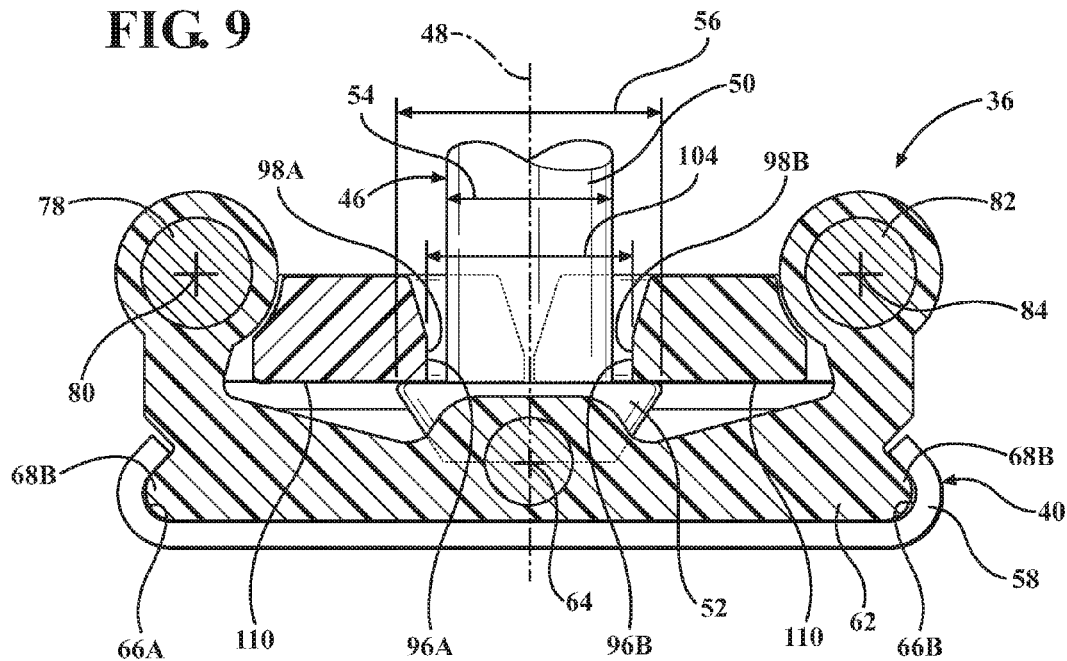
FIG. 9 is a schematic cross sectional view of the latch system showing the pintle latched to the latch mechanism.

Referring to FIGS. 7 through 9, the support plate 62 may be coupled to the base plate 58 in any suitable manner that allows slideable movement of the support plate 62 relative to the base plate 58. For example and as shown, the base plate 58 defines at least one groove 66A 66B, which extends parallel to the release axis 64. The support plate 62 defines at least one slide 68A, 68B, which is disposed within and engages one of the grooves 66A, 66B. One of the slides 68A, 68B engages one of the grooves 66A, 66B such that the grooves 66A, 66B guide the support plate 62 along the release axis 64 relative to the base plate 58. As shown, the base plate 58 defines a first groove 66A and a second groove 66B, disposed on opposite longitudinal sides of the base plate 58, and the support plate 62 defines a first slide 68A and a second slide 68B disposed on opposite longitudinal sides of the support plate 62. The first slide 68A is disposed within the first groove 66A, and the second slide 68B is disposed within the second groove 66B. The position and semi-circular configuration of the first groove 66A and the second groove 66B not only guide the first slide 68A and the second slide 68B along the release axis 64, but also operate to secure the support plate 62 relative to the base plate 58 by curling around and partially encircling the longitudinal edges of the first slide 68A and the second slide 68B respectively.

Referring to FIG. 1, the support plate 62 is coupled to the release mechanism 42 for movement along the release axis 64 in response to the release mechanism 42. The support plate 62 may be coupled to the release mechanism 42 in any suitable manner. For example, the cable 44 may extend between and couple the support plate 62 and the release mechanism 42. Actuation of the release mechanism 42 in a first manner may cause the cable 44 to move along the release axis 64 in a first direction 70, thereby moving the support plate 62 along the release axis 64 in the first direction 70. Further actuation of the release mechanism 42 in a second manner, may move the cable 44 along the release axis 64 in a second direction 72, thereby moving the support plate 62 along the release axis 64 in the second direction 72.

Referring to FIGS. 5 and 7 through 9, the latch mechanism 40 further includes a first latch door 74 and a second latch door 76. The first latch door 74 is rotatable between a respective latch position, best shown in FIG. 9 and a respective insertion position, best shown in FIG. 8. Similarly, the second latch door 76 is rotatable between a respective latch position, best shown in FIG. 9 and a respective insertion position, best shown in FIG. 8. The support plate 62 rotatably supports both the first latch door 74 and the second latch door 76. The first latch door 74 and the second latch door 76 are generally disposed opposite each other. Both the first latch door 74 and the second latch door 76 are moveable with the support plate 62 along the release axis 64.

Figure 6:
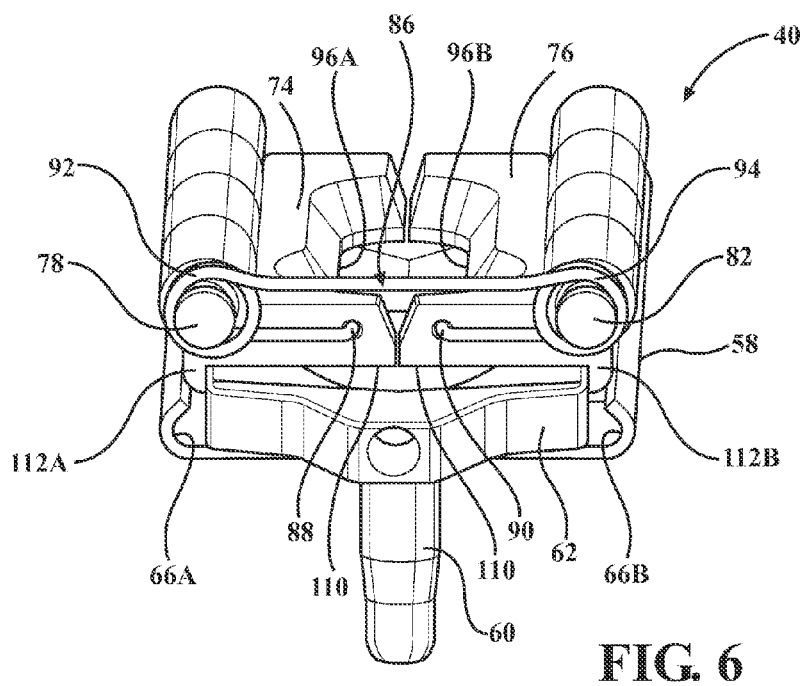
FIG. 6 is a schematic perspective view of the latch mechanism.

Referring to FIG. 6, a first pin 78 interconnects the first latch door 74 and the support plate 62. The first pin 78 defines a first axis 80 about which the first latch door 74 rotates. A second pin 82 interconnects the second latch door 76 and the support plate 62. The second pin 82 defines a second axis 84 about which the second latch door 76 rotates. Both the first axis 80 and the second axis 84 are parallel with each other, and the release axis 64. Additionally, both the first axis 80 and the second axis 84 are disposed on a common plane.

Referring to FIGS. 7 and 9, when disposed in their respective latch positions, the first latch door 74 and the second latch door 76 are substantially disposed on or are co-planar with the common plane of the first axis 80 and the second axis 84. Referring to FIG. 8, when disposed in their respective insertion positions, the first latch door 74 and the second latch door 76 are angled downward, as viewed in FIG. 8, toward the support plate 62 and the base plate 58.

Referring to FIGS. 5 and 6, the latch mechanism 40 includes a biasing device 86 that biases the first latch door 74 and the second latch door 76 into their respective latch positions. The biasing device 86 is operable to bias the first latch door 74 and the second latch door 76 relative to the support plate 62. The biasing device 86 may include one or more springs, or some other similar device. Additionally, and as shown, the biasing device 86 may interconnect the first latch door 74 and the second latch door 76 together. As shown in FIG. 6, the biasing device 86 may include a wire spring having a first end 88 attached to the first latch door 74, and a second end 90 attached to the second latch door 76. The wire spring includes a first spring loop 92 wrapped around the first pin 78 to indirectly couple the wire spring to the support plate 62, and a second spring loop 94 wrapped around the second pin 82 to indirectly couple the wire spring to the support plate 62.

Referring to FIG. 5, the first latch door 74 and the second latch door 76 each include a distal edge 96. The distal edge 96 of the first latch door 74 is hereinafter referred to by the reference numeral 96A, and the distal edge 96 of the second latch door 76 is hereinafter referred to by the reference numeral 96B. The distal edges 96 of both the first latch door 74 and the second latch door 76 may be referred to generically within the written specification by the reference numeral 96. The distal edge 96A of the first latch door 74 and the distal edge 96B of the second latch door 76 are generally mirror images of each other, and each define a latch section 98 and a release section 100 disposed opposite each other. The latch section of the first latch door 74 is hereinafter referred to by the reference numeral 98A, and the latch section of the second latch door 76 is hereinafter referred to by the reference numeral 98B. The latch sections 98 of both the first latch door 74 and the second latch door 76 may be referred to generically within the written specification by the reference numeral 98. Similarly, the release section of the first latch door 74 is hereinafter referred to by the reference numeral 100A, and the release section of the second latch door 76 is hereinafter referred to by the reference numeral 100B. The release sections 100 of both the first latch door 74 and the second latch door 76 may be referred to generically within the written specification by the reference numeral 100. Accordingly, the latch section 98A of the distal edge 96A of the first latch door 74 is disposed opposite and across from the latch section 98B of the distal edge 96B of the second latch door 76. Similarly, the release section 100A of the distal edge 96A of the first latch door 74 is disposed opposite and across from the release section 100B of the distal edge 96B of the second latch door 76.

When the first latch door 74 and the second latch door 76 are disposed in their respective latch positions, the latch sections 98 and the release sections 100 of the first latch door 74 and the second latch door 76 cooperate to define a keyhole shaped slot 102 between the first latch door 74 and the second latch door 76. Accordingly, when the first latch door 74 and the second latch door 76 are disposed in their respective latch positions, the latch sections 98 of the first latch door 74 and the second latch door 76 define a latch distance 104 therebetween. Also, when the first latch door 74 and the second latch door 76 are disposed in their respective latch positions, the release sections 100 of the first latch door 74 and the second latch door 76 define a release distance 106 therebetween. The latch distance 104 is less than the release distance 106. Referring to FIG. 8, when the first latch door 74 and the second latch door 76 are disposed in their respective insertion positions, the latch sections 98 of the first latch door 74 and the second latch door 76 define an insertion distance 108 therebetween.

As noted above, the head portion 52 of the pintle 46 defines the head diameter 56. The head diameter 56 is greater than the latch distance 104, and is less than the insertion distance 108. As such, the head portion 52 of the pintle 46 may pass between the latch sections 98 of the first latch door 74 and the second latch door 76 when the first latch door 74 and the second latch door 76 are disposed in their respective insertion positions, but may not pass therebetween when the first latch door 74 and the second latch door 76 are disposed in their respective latch positions. Furthermore, the head diameter 56 is less than the release diameter, such that the head portion 52 may pass through the release sections 100 of the first latch door 74 and the second latch door 76 when the first latch door 74 and the second latch door 76 are disposed in either their respective latch positions or release positions.

The latch sections 98 of the first latch door 74 and the second latch door 76 are operable to receive the head portion 52 of the pintle 46 therebetween when the first latch door 74 and the second latch door 76 are disposed in their respective insertion positions. As such, movement of the pintle 46, substantially along the pintle axis 48, brings the head portion 52 of the pintle 46 into contact with the first latch door 74 and the second latch door 76. As shown in FIG. 8, continued movement of the pintle 46 along the pintle axis 48 pushes or biases the first latch door 74 and the second latch door 76 into their respective insertion positions. Once the pintle 46 has pushed the first latch door 74 and the second latch door 76 into their respective insertion positions, the head portion 52 of the pintle 46 may pass between the first latch door 74 and the second latch door 76, because the head diameter 56 of the head portion 52 is less than the insertion distance 108 between the first latch portion and the second latch portion when the first latch door 74 and the second latch door 76 are disposed in their respective insertion positions.

Referring to FIG. 9, after the head portion 52 of the pintle 46 has been pushed past a lower surface 110 of the first latch section 98A and the second latch section 98B of the first latch door 74 and the second latch door 76 respectively, the latch sections 98 of the first latch door 74 and the second latch door 76 are operable to return to their respective latch positions and engage the head portion 52 of the pintle 46 in latching engagement. As noted above, the biasing device 86 biases the first latch door 74 and the second latch door 76 into their respective latch positions. After the head portion 52 of the pintle 46 has passed between the latch sections 98 of the first latch door 74 and the second latch door 76, the biasing device 86 biases the first latch door 74 and the second latch door 76 back into their respective latch positions to latch the pintle 46 to the latch mechanism 40. It should be appreciated that the shank diameter 54 is less than the latch distance 104, so that the shank portion 50 of the pintle 46 does not interfere with the movement of the first latch door 74 and the second latch door 76 into their respective latch positions.

Referring to FIG. 6, each of the first latch door 74 and the second latch door 76 include a stop. The stop of the first latch door 74 is hereinafter referred to by the reference numeral 112A, and the stop of the second latch door 76 is hereinafter referred to by the reference numeral 112B. The stops 112A, 112B are operable to engage the support plate 62 when the first latch door 74 and the second latch door 76 are disposed in their respective latch positions. The stops 112A, 112B prevent over-rotation of the first latch door 74 and the second latch door 76 beyond their respective latch positions. Accordingly, while the biasing device 86 biases the first latch door 74 and the second latch door 76 into their respective latch position, it may be possible for the biasing device 86 to move or rotate the first latch door 74 and the second latch door 76 to far, such that the first latch door 74 and the second latch door 76 are angled generally upward, away from the support plate 62 and the base plate 58. The stops 112A, 112B prevent such over-rotation, and operate to position the first latch door 74 and the second latch door 76 on or co-planar with the common plane of the first axis 80 and the second axis 84.

The release sections 100 of the first latch door 74 and the second latch door 76 are operable to release the head portion 52 of the pintle 46 from latching engagement with the first latch door 74 and the second latch door 76, when the first latch door 74 and the second latch door 76 are disposed in their respective latch positions. Referring to FIG. 4, movement of the first latch door 74 and the second latch door 76 along the release axis 64, relative to the pintle 46, into the release position of the latch mechanism 40, positions the head portion 52 of the pintle 46 between the release sections 100 of the first latch door 74 and the second latch door 76 so that the pintle 46 may be de-latched from the latch mechanism 40. As noted above, movement along the release axis 64 is substantially perpendicular to the pintle axis 48. As such, movement of the latch doors along the release axis 64 in the first direction 70 moves the latch doors relative to the pintle 46, which moves the relative position of the pintle 46 from the latch sections 98 of the first and second latch doors 74, 76 into the release sections 100 of the latch doors. Because the release distance 106 between the first release section 100A and the second release section 100B is greater than the head diameter 56, the head portion 52 of the pintle 46 may pass between the release sections 100 of the first latch door 74 and the second latch door 76, even when the first latch door 74 and the second latch door 76 are disposed in their respective latch positions.

Further actuation of the release mechanism 42, to move the cable 44 in the second direction 72, also moves the first latch door 74 and the second latch door 76 in the second direction 72, to move the latch mechanism 40 from the release position back into its latch position. When disposed in the latch position, the latch mechanism 40 is ready to receive the pintle 46 again in latched engagement as described above, such as is shown in FIG. 7.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A latch system comprising:
   a striker including a pintle having a head portion and extending along a pintle axis;
   a latch mechanism releasably engageable with the pintle, wherein the latch mechanism includes:
   a first latch door rotatable between a latch position and an insertion position;
   a second latch door rotatable between a latch position and an insertion position;
   wherein the first latch door and the second latch door each include a distal edge defining a latch section and a release section disposed opposite each other;
   wherein the latch sections of the first latch door and the second latch door are operable to receive the head portion of the pintle therebetween when the first latch door and the second latch door are disposed in their respective insertion positions;
   wherein the latch sections of the first latch door and the second latch door are operable to engage the head portion of the pintle in latching engagement when the first latch door and the second latch door are disposed in their respective latch positions;
   wherein the release sections of the first latch door and the second latch door are operable to release the head portion of the pintle from latching engagement with the first latch door and the second latch door;
   a biasing device biasing the first latch door and the second latch door into their respective latch positions; and
   a support plate rotatably supporting both the first latch door and the second latch door, wherein the support plate is moveable relative to the pintle along a release axis, in a direction substantially perpendicular to the pintle axis, with both the first latch door and the second latch door being moveable with the support plate along the release axis.

2. The latch system set forth in claim 1 wherein the first latch door, and the second latch door, are moveable, in unison, relative to the pintle along a release axis, in a direction substantially perpendicular to the pintle axis.

3. The latch system set forth in claim 2 wherein:
   movement of the pintle substantially along the pintle axis into contacting engagement with the latch sections of the first latch door and the second latch door moves the first latch door and the second latch door into their respective insertion positions to allow the head portion of the pintle to pass between the latch sections of the first latch door and the second latch door;
   the biasing device biases the first latch door and the second latch door into their respective latch positions, after the head portion of the pintle has passed between the latch sections of the first latch door and the second latch door, to latch the pintle to the latch mechanism; and
   movement of the first latch door and the second latch door along the release axis relative to the pintle, positions the head portion of the pintle between the release sections of the first latch door and the second pivoting latch to de-latch the pintle from the latch mechanism.

4. The latch system set forth in claim 1 further comprising a first pin interconnecting the first latch door and the support plate, wherein the first pin defines a first axis about which the first latch door rotates.

5. The latch system set forth in claim 4 further comprising a second pin interconnecting the second latch door and the support plate, wherein the second pin defines a second axis about which the second latch door rotates.

6. The latch system set forth in claim 1 wherein the biasing device is operable to bias the first latch door and the second latch door relative to the support plate.

7. The latch system set forth in claim 6 wherein the biasing device interconnects the first latch door and the second latch door together.

8. The latch system set forth in claim 1 wherein each of the first latch door and the second latch door include a stop for engaging the support plate when the first latch door and the second latch door are disposed in their respective latch positions, to prevent over-rotation of the first latch door and the second latch door beyond their respective latch positions.

9. The latch system set forth in claim 1 further comprising a base plate slideably supporting the support plate, wherein the base plate is configured for attachment to a structure.

10. The latch system set forth in claim 9 wherein the base plate defines a groove extending parallel to the release axis, and wherein the support plate defines a slide disposed within and engaging the groove, such that the engagement between the slide and the groove guides the support plate along the release axis relative to the base plate.

11. The latch system set forth in claim 1 wherein the head portion of the pintle defines a head diameter, the latch sections of the first latch door and the second latch door define a latch distance therebetween when the first latch door and the second latch door are disposed in their respective latch positions, the latch sections of the first latch door and the second latch door define an insertion distance therebetween when the first latch door and the second latch door are disposed in their respective insertion positions, and wherein the head diameter is greater than the latch distance, and the head diameter is less than the insertion distance.

12. The latch system set forth in claim 11 wherein the release sections of the first latch door and the second latch door define a release distance therebetween when the first latch door and the second latch door are disposed in their respective latch positions, and wherein the head diameter is less than the release diameter.

13. A tailgate assembly for a vehicle, the tailgate assembly comprising:
   a structure including an interior surface defining a compartment, a first lateral edge surface, and a second lateral edge surface, wherein the first lateral edge surface and the second lateral edge surface are disposed on opposite lateral edges of the interior surface;
   a cover moveably attached to the structure for covering the compartment, wherein the cover includes a striker having a pintle extending along a pintle axis and including a head portion disposed at a distal end of the pintle;
   a latch mechanism attached to the structure and releasably engageable with the pintle; and
   a release mechanism coupled to the latch mechanism and disposed on one of the first lateral edge surface or the second lateral edge surface of the structure;
   wherein the latch mechanism includes:
   a base plate attached to the structure;

a support plate slideably supported by the base plate and coupled to the release mechanism for movement along a release axis, in a direction substantially perpendicular to the pintle axis, when actuated by the release mechanism;

a first latch door rotatably supported by the support plate and moveable with the support plate along the release axis, and rotatable between a latch position and an insertion position;

a second latch door rotatably supported by the support plate and moveable with the support plate along the release axis, and rotatable between a latch position and an insertion position;

wherein the first latch door and the second latch door each include a distal edge defining a latch section and a release section disposed opposite each other;

wherein the latch sections of the first latch door and the second latch door are operable to receive the head portion of the pintle therebetween when the first latch door and the second latch door are disposed in their respective insertion positions;

wherein the latch sections of the first latch door and the second latch door are operable to engage the head portion of the pintle in latching engagement when the first latch door and the second latch door are disposed in their respective latch positions;

wherein the release sections of the first latch door and the second latch door are operable to release the head portion of the pintle from latching engagement with the first latch door and the second latch door;

a biasing device biasing the first latch door and the second latch door into their respective latch positions; and wherein the support plate rotatably supports both the first latch door and the second latch door, and is moveable relative to the pintle along the release axis, with both the first latch door and the second latch door being moveable with the support plate along the release axis.

14. The tailgate assembly set forth in claim 13 wherein the biasing device interconnects the first latch door and the second latch door together.

15. The tailgate assembly set forth in claim 13 further comprising a first pin interconnecting the first latch door and the support plate, and a second pin interconnecting the second latch door and the support plate, wherein the first pin defines a first axis about which the first latch door rotates, and wherein the second pin defines a second axis about which the second latch door rotates.

16. The tailgate assembly set forth in claim 13 wherein each of the first latch door and the second latch door include a stop for engaging the support plate when the first latch door and the second latch door are disposed in their respective latch positions, to prevent over-rotation of the first latch door and the second latch door beyond their respective latch positions.

17. The tailgate assembly set forth in claim 13 wherein the head portion of the pintle defines a head diameter, the latch sections of the first latch door and the second latch door define a latch distance therebetween when the first latch door and the second latch door are disposed in their respective latch positions, the latch sections of the first latch door and the second latch door define an insertion distance therebetween when the first latch door and the second latch door are disposed in their respective insertion positions, the release sections of the first latch door and the second latch door define a release distance therebetween when the first latch door and the second latch door are disposed in their respective latch positions, wherein the head diameter is greater than the latch distance, the head diameter is less than the insertion distance, and the head diameter is less than the release diameter.

* * * * *